Oct. 18, 1960  J. J. TOROK  2,956,371
INSULATED SHEAR MECHANISM
Filed Oct. 17, 1957
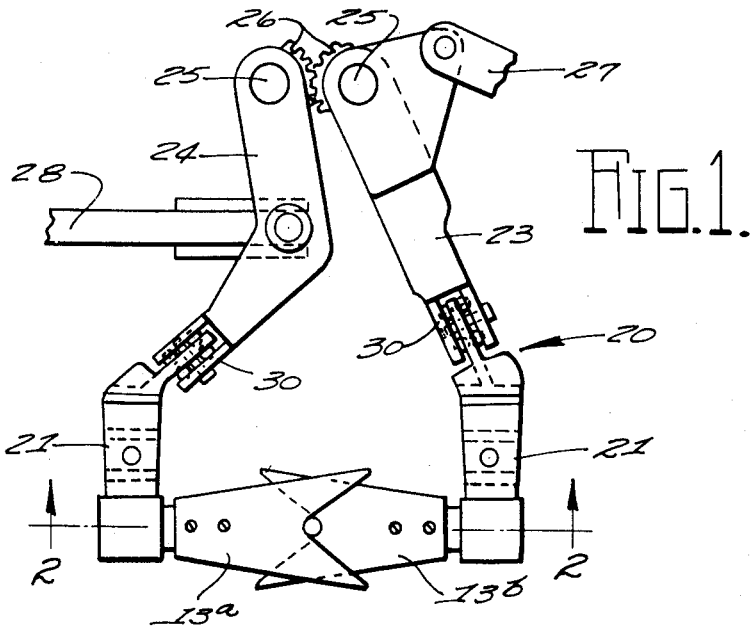
FIG.1.
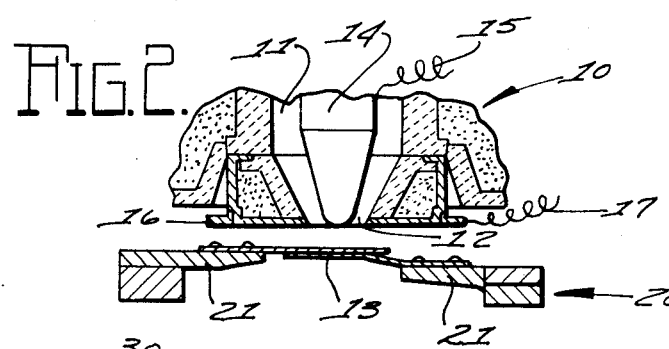
FIG.2.
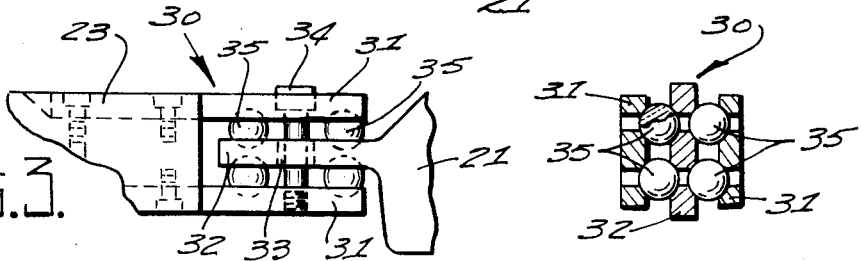
FIG.3.
FIG.4.
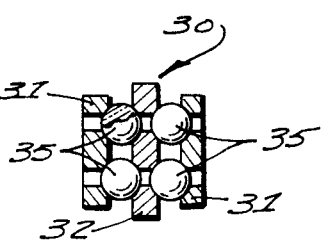
FIG.5.
INVENTOR.
J. J. TOROK
BY
E. J. HOLLER &
W. A. SCHAICH
ATTORNEYS.

United States Patent Office 2,956,371
Patented Oct. 18, 1960

2,956,371

INSULATED SHEAR MECHANISM

Julius J. Torok, Toledo, Ohio, assignor to Kimble Glass Company, a corporation of Ohio Filed Oct. 17, 1957, Ser. No. 690,840

1 Claim. (Cl. 49—14)

The present invention relates generally to improvements in shear mechanism and more particularly to insulated shear mechanism for severing mold charges from a charged column or body of molten glass that is being fed downwardly by a glass feeder. Essentially the shears may be used for severing other molten or plastic materials at high temperature where the material is electrically charged.

The invention as herein illustrated is of particular utility in the glass art and is shown as an improvement over known or conventional shearing mechanism which severs formed gobs or mold charges from a supply body of molten glass issuing from a furnace forehearth. Heretofore, apparatus of this character comprises a pair of shear blades which swing into and out of position to sever the issuing molding charges of molten glass, the blades being fully supported by electrically conductive metal arms.

In one type of glass feeder employed above the subject shear mechanism may be utilized to form suspended molten glass mold charges. In suspended charge feeders quantities of molten glass are periodically discharged at a controlled rate and in a preferred form from the lower portion of a feeder outlet, its forehearth being associated with a glass melting furnace. At predetermined times during the discharge of the molten glass from the outlet or spout, a shear mechanism is operated beneath the spout to sever individual charges or gobs from the pendent stream of discharging glass. These gobs may be directed to suitable molds as desired in which the gobs may be fabricated into articles by any number of forming processes well known in the art.

The subject shear mechanism is especially directed to utilization with an electrically heated feeder containing glass at an electrical potential in the feeder bowl and outlet. Electrical heating thereat is desirable to control the temperature and other physical properties of the glass being emitted from the feeder outlet. At elevated temperatures the electrical resistance of the glass is lowered considerably so that it furnishes a conductive path for electrical current which principles are widely known and understood in the art.

A serious deficiency in all known shear mechanisms is that upon contact with the electrically charged molten glass, the electrical current flow pattern is disrupted during the interval when the blades of the shearing mechanism are in contact with the glass stream creating disruptive conditions in utilization of electrical heating. Obviously, when the shearing mechanism is not in contact with the glass stream, electrical conditions within the glass may be properly balanced. However, upon contact of the glass stream by ordinary shear blades, a temporary grounding of electrical current occurs adversely effecting the molden mold charge separated from the stream as well as the main body of the stream contained in the forehearth. The problem becomes more severe as the electrical potential between glass in the forehearth and ground approaches a greater differential.

At relatively high speeds of feeder operation and shearing electrical currents have been observed to fluctuate widely preventing adequate control over glass properties of the molten mold charges. With such high speed operation insulation of the forehearth and feeder terminals alone is inadequate to attain satisfactory results in the charge-severing operation. The effect of the shears on the glass produces objectionable defects therein and the life of the shear blades is shortened when the electrical energy is permitted to ground therethrough.

Most forms of electrically heated glass feeders raise the potential of the glass to such a high voltage that the shear blades cutting the stream become damaged by the accompanying arc. Previously this condition has been avoided by insulating the shear blades with commercially available organic or semi-organic insulation. This insulation yields under conditions of operation of the shear blades where excessive heat from the feeder and forehearth and moisture from the blade cooling spray are present. The yieldable and distortable features of such insulation cause the shear blades to shift out of alignment during continuous operation. As a result the shear blade edges become scored producing ragged and unsatisfactory cuts of mold charges. Furthermore, insulating the operating and controlling areas of the shear mechanism at regions remote from the shear blades has been inadequate due to more widespread possibilities of short circuiting and the inherent dangers presented to operating personnel.

Accordingly, it is an object of the present invention to provide improved apparatus for overcoming and eliminating the aforesaid objections in molten charge severing and to provide adequate electrical insulation of the shears for contacting a thermoplastic supply body at an electrical potential. The invention provides electrical insulation combined with the shear mechanism in a manner adapted to swing or move with the shear blades and comprising a rigid structural portion of the shear arms. The apparatus may include a pair of shear arms mounted to swing horizontally for moving the shear blades to and from the glass severing position, the extremities of the arms being electrically isolated from pivotal support members.

Another object of this invention is to provide shear mechanism capable of severing a stream of molten or plastic material at high temperature having an electrical charge thereon without disruptive effect upon electromotive forces passing through the thermoplastic material.

A further object of this invention is to provide in combination a shear mechanism comprising a pair of shear arms carrying cutting blades which are electrically insulated from the supporting and actuating parts of the shear mechanism. The subject apparatus has electrically insulated blades adaptable to severing a stream of molten glass into mold charges without creating undesirable surges of electrical energy within and outwardly from the glass.

The specific nature of this invention, as well as other objects and advantages thereof, will become apparent to those skilled in the art from the following detailed description, taken in conjunction with the annexed sheet of drawings on which by way of preferred example only, are illustrated the preferred embodiments of this invention.

Referring to the accompanying drawings which illustrate the invention as used in connection with a conventional form of glass feeding and shearing mechanism:

Fig. 1 is a plan view of the apparatus, the shears being shown in full lines in their cutting position.

Fig. 2 is a fragmentary vertical sectional view through the outlet portion of a glass feeder with shear mechanism embodying the present invention disposed below the feeder outlet, the view through the shear mechanism being substantially along the line 2—2 of Fig. 1.

Fig. 3 is a fragmentary top view of the insulating portion of one shear arm.

Fig. 4 is a side elevational view of the same.

Fig. 5 is a section at the line 5—5 of Fig. 4.

Referring to Fig. 2, the glass feeder comprises a forehearth 10 into which molten glass flows from a melting and refining tank. The forehearth is formed with a well 11 and a bottom outlet or orifice 12 through which the molten glass issues. The issuing glass is suspended in the form of gobs or mold charges which are severed by a pair of shears 13. The issuance of the glass and formation of the mold charges or gobs is controlled by a vertically reciprocating plunger 14 which is conventionally surrounded by a tube (not shown). The tube and plunger 14 are reciprocated in a conventional manner in cooperation with the movements of the shear blades.

Plunger 14 which operates within the feeder well 11 has an electrical terminal 15 connected thereto for supplying electrical energy to the glass. The feeder outlet is defined by an orifice ring 16 having an electrical terminal 17 connected thereto. The flow of electrical current from one terminal to the other is thus through the molten glass contained within the well 11. Widespread variation of electrical circuitry may be employed within the feeder for the passage of electrical current through the glass to controllably heat and condition the same for proper delivery of the molten glass to forming machines.

Shear mechanism 20 is positioned immediately below orifice 12 so that shear blades 13 carried by shear arm extensions 21 reside in overlapping relationship in cutting position. When the arms are swung to effect closing the shear blades in the cutting operation, the V-shaped cutting surfaces of the blades intersect and overlap in generally transverse axial alignment with the stream of molten glass discharging from the feeder to sever an individual gob or mold charge.

As shown in Fig. 1, the blades 13a and 13b are carried on the shear arm extensions 21 attached to shear arm members 23 and 24, respectively. Arm members 23 and 24 are mounted on vertical pivot pins 25 and are interconnected by a pair of intermeshing gears 26 to swing in unison. The shears may be swung to and from their open or retracted position to the severing or nearly closed position indicated in Fig. 1 with blades 13a and 13b in contiguous overlapping relationship.

Suitable mechanism such as that shown in part in Fig. 1 and fully disclosed in Patent No. 1,760,435 granted to Carl E. Peiler for shear mechanism for glass feeders may be provided to cause the shear arms to swing about their pivots toward each other to close the shear blades for each cutting operation. Shear arm members 23 and 24 are shown pivotally connected to rock arms 27 and 28 respectively. The gob feeding and shearing apparatus as above detailed is conventional in the art insofar as the shear arms comprise rigid electrically conductive structures for carrying the shear blades in cooperative arrangement.

In accordance with the present invention, each of the shear arm members 23 and 24 have a somewhat similar shear arm extension 21 connected thereto by means of an electrically insulating assembly 30. In the insulated intermediate portion of each shear arm, a solid ceramic insulation which will not yield or distort under heat or moisture is employed to provide a resistive barrier to the passage of electrical energy. Ceramics having normal physical properties tend to be weak in tension and strong in compression. In the preferred form of the present invention, glass or other ceramic or vitreous material is retained in compression to insulate the shear blade from the pivotal mounting of each shear arm.

The insulated portion of shear arm extension 21 is supported on both sides by glass cylinders or spheres so that a force in any direction will be transmitted through the glass as a compressive force.

As shown in Fig. 3, rigid shear arm member 23 has attached to its free end a pair of retention plates 31 which extend beyond its free end to form a yoke. Plates 31 may be connected to member 23 by several machine bolts. Shear arm extension 21 has a tongue portion 32 formed on its supported end adaptable to free insertion interiorly between the yoke formed by plates 31. Considerable clearance is provided between plates 31 and tongue portion 32. Both the outer plates 31 and tongue 32 have openings or recesses therein disposed in alignment for retaining a plurality of glass or ceramic spheres 35. The openings as shown may consist of a series of three holes extending coextensively through members 31 and 32. As shown on Figs. 3, 4 and 5 a total of six spheres 35 are retained within the tongue and yoke assembly with pairs of spheres arranged in horizontal alignment.

Tongue 32 is provided with a central opening 33 through which passes a clamping bolt 34 adaptable to drawing the assembly 30 together and providing compression on each of the glass spheres 35. The series of six spheres permit drawing the parts into firmly clamped arrangement with suitable distribution of compressive forces. Bolt 34 does not contact tongue 32 so that electrical resistance is established in the shear arms by means of the plurality of highly resistant glass spheres 35 and air spaces between the clamped parts.

Fig. 5 illustrates in section the arrangement of four spheres 35 held in a single vertical plane to provide a strong and durable attachment of the several shear arm parts 23 and 21. The illustrated connecting assembly is fully insulating, non-shifting and capable of resisting any distortion or misalignment under operative conditions of excessive heat or moisture.

After the insulating region is assembled the construction may be water-proofed as desired by wrapping the area tightly with an elastomeric electrical tape which when heated becomes vulcanized to metal shear arms and forms a water-proof seal. If necessary, the elastomeric covering can be protected from heat with an enclosing layer of silicon-impregnated glass cloth or tape. The assembly may also be protected by cover plates as desired.

The insulating structure has been found to possess features of durability and electrical resistivity far exceeding any other form of insulation in shearing mechanisms.

Various modifications of the invention may be resorted to within the spirit and scope of the appended claim.

I claim:

In a shearing apparatus for separating a supply body of electrically charged molten glass issuing from a glass feeder into mold charges, said apparatus including a pair of metallic severing blades carried by a respective pair of pivotal arms and disposed beneath said glass feeder for periodic cooperative movement into and out of contact with the molten glass, the improvement of a durable electrically insulative rigid joint arranged in an intermediate area of each of said pivotal arms and adapted to withstand adverse operating conditions, each of said arms being comprised of at least two metallic members interconnected by spaced-apart tongue and yoke portions, a plurality of oppositely-disposed similar recesses formed in the internal opposing surfaces of said tongue and yoke portions, a plurality of similar rigid non-conducting vitreous spheres disposed intermediate of and contacting said tongue and yoke portions, one sphere being individual to each of said opposing recesses, an aperture formed in said tongue, and at least one fastening member extending through said tongue aperture joining the arms of said yoke to maintain said spheres in stationary compression and said metallic arm members in fixed relation.

References Cited in the file of this patent

UNITED STATES PATENTS

| | | |
|---|---|---|
| 532,160 | Law | Jan. 8, 1895 |
| 1,200,984 | Reeves | Oct. 10, 1916 |
| 1,760,435 | Peiler | May 27, 1930 |
| 1,856,330 | Greene | May 3, 1932 |
| 2,265,359 | De Neumann | Dec. 9, 1941 |
| 2,548,713 | Fisher | Apr. 10, 1951 |